United States Patent
Chiueh et al.

(10) Patent No.: US 9,197,613 B2
(45) Date of Patent: *Nov. 24, 2015

(54) DOCUMENT PROCESSING METHOD AND SYSTEM

(75) Inventors: Tzi-Cker Chiueh, Taipei (TW); Dilip Simha, East Setauket, NY (US)

(73) Assignee: Industrial Technology Research Institute, Hsinchu (TW)

( * ) Notice: Subject to any disclaimer, the term of this patent is extended or adjusted under 35 U.S.C. 154(b) by 128 days.

This patent is subject to a terminal disclaimer.

(21) Appl. No.: 13/330,721

(22) Filed: Dec. 20, 2011

(65) Prior Publication Data

US 2013/0159694 A1    Jun. 20, 2013

(51) Int. Cl.
*H04L 9/00* (2006.01)
*H04L 29/06* (2006.01)

(52) U.S. Cl.
CPC .................................. *H04L 63/0478* (2013.01)

(58) Field of Classification Search
CPC ............. H04L 9/008; G06F 17/30038; G06F 17/30268; G06F 17/30752; G06F 17/3082
USPC ........................................................ 713/150
See application file for complete search history.

(56) References Cited

U.S. PATENT DOCUMENTS

| | | | |
|---|---|---|---|
| 7,080,073 B1 * | 7/2006 | Jiang et al. | |
| 7,181,017 B1 * | 2/2007 | Nagel ................... | H04L 9/0825 380/282 |
| 7,216,290 B2 * | 5/2007 | Goldstein et al. ............. | 715/234 |
| 7,412,535 B2 | 8/2008 | Agarwalla et al. | |
| 7,426,534 B2 | 9/2008 | Challenger et al. | |
| 7,751,565 B2 | 7/2010 | Yuen | |
| 7,869,591 B1 | 1/2011 | Nagel et al. | |
| 7,957,535 B2 | 6/2011 | Ochi et al. | |
| 8,046,365 B2 | 10/2011 | Saito | |
| 8,060,394 B2 | 11/2011 | Woodings et al. | |
| 8,218,166 B2 | 7/2012 | Saito | |
| 8,316,237 B1 * | 11/2012 | Felsher et al. ................ | 713/171 |
| 8,520,844 B2 * | 8/2013 | MacKenzie ........... | H04L 9/3013 380/282 |

(Continued)

FOREIGN PATENT DOCUMENTS

CN    1347049    5/2002

OTHER PUBLICATIONS

Marten van Dijk et al., "Fully Homomorphic Encryption over the Integers", EUROCRYPT 2010, Lecture Notes in Computer Science, 2010, vol. 6110/2010, 2010, pp. 24-43.

(Continued)

*Primary Examiner* — Azizul Choudhury
*Assistant Examiner* — Tariq Najee-Ullah
(74) *Attorney, Agent, or Firm* — Jianq Chyun IP Office (57) ABSTRACT

A document processing method and system are provided. A client divides at least one document into a plurality of document pages, and individually encrypts the document pages by a first key to obtain a plurality of encrypted pages. The client removes a part of words from the document pages to obtain a plurality of significant words, and individually encrypts the significant words by a second key different to the first key to obtain a plurality of encrypted significant words. The client records the encrypted significant words and a plurality of first index information in a significant word set (SWS), where the first index information indicates a page in the encrypted pages where the encrypted significant word comes from. Then, the client transmits the encrypted pages and the SWS to a remote server for storage.

23 Claims, 5 Drawing Sheets

(56) References Cited

U.S. PATENT DOCUMENTS

| | | | |
|---|---|---|---|
| 8,532,289 B2* | 9/2013 | Gentry | H04L 9/008 380/277 |
| 8,595,508 B2 | 11/2013 | Yuen | |
| 8,630,409 B2* | 1/2014 | Woodruff | H04L 9/0838 380/28 |
| 8,630,422 B2* | 1/2014 | Gentry | H04L 9/0822 380/281 |
| 8,660,876 B2 | 2/2014 | Woodings et al. | |
| 8,861,716 B2* | 10/2014 | Halevi | H04L 9/008 380/28 |
| 9,002,007 B2* | 4/2015 | Nabeel | H04L 9/008 380/255 |
| 2002/0010798 A1 | 1/2002 | Ben-Shaul et al. | |
| 2002/0091836 A1 | 7/2002 | Moetteli | |
| 2003/0055831 A1 | 3/2003 | Ryan et al. | |
| 2004/0101142 A1 | 5/2004 | Nasypny | |
| 2006/0167860 A1 | 7/2006 | Eliashberg et al. | |
| 2007/0005594 A1* | 1/2007 | Pinkas et al. | 707/6 |
| 2007/0180356 A1 | 8/2007 | Sun | |
| 2008/0077570 A1* | 3/2008 | Tang et al. | 707/5 |
| 2008/0098300 A1* | 4/2008 | Corrales et al. | 715/243 |
| 2008/0133935 A1 | 6/2008 | Elovici et al. | |
| 2010/0070448 A1* | 3/2010 | Omoigui | 706/47 |
| 2010/0146299 A1* | 6/2010 | Swaminathan et al. | 713/189 |
| 2010/0257165 A1* | 10/2010 | Jin et al. | 707/728 |
| 2011/0110525 A1 | 5/2011 | Gentry | |
| 2011/0145594 A1 | 6/2011 | Jho et al. | |
| 2012/0260108 A1 | 10/2012 | Lee | |
| 2013/0170640 A1* | 7/2013 | Gentry | 380/30 |

OTHER PUBLICATIONS

Craig Gentry, "Computing Arbitrary Functions of Encrypted Data", Communications of the ACM, vol. 53 Issue 3, Mar. 2010, pp. 97-104.
Craig Gentry et al., "Implementing Gentry's Fully-Homomorphic Encryption Scheme—Preliminary Report", EUROCRYPT'11 Proceedings of the 30th Annual international conference on Theory and applications of cryptographic techniques: advances in cryptology, Aug. 5, 2010, pp. 1-30.
Craig Gentry, "A Fully Homomorphic Encryption Scheme", A Dissertation Submitted to the Department of Computer Science and the Committee on Graduate Studies of Stanford University in Partial Fulfillment of the Requirements for the Degree of Doctor of Philosophy, Sep. 2009.
Ronald L. Rivest et al., "Data Banks and Privacy Homomorphisms", Foundations of Secure Computation (1978), 1978, pp. 169-180.
N.P. Smart et al., "Fully Homomorphic SIMD Operations", In IACR Cryptology ePrint Archive, vol. 2011, Mar. 2011 , Total 19 pages.
"Office Action of Co-pending U.S. Appl. No. 13/454,103", issued on Oct. 7, 2013, p. 1-p. 19.
"Office Action of Taiwan Counterpart Application", issued on Jun. 12, 2014, p. 1-p. 10.
Yan-Cheng Chang, et al, "Privacy Preserving Keyword Searches on Remote Encrypted Data," Springer-Verlag Berlin Heidelberg 2005, pp. 422-pp. 455.
Philippe Golle, et al, "Secure Conjunctive Keyword Search over Encrypted Data," Springer-Verlag Berlin Heidelberg 2004, pp. 31-pp. 45.
"Notice of Allowance of Co-pending U.S. Appl. No. 13/454,103", issued on May 9, 2014, p. 1-p. 9.
"Office Action of China Counterpart Application" , issued on May 29, 2015, p. 1-p. 7.

* cited by examiner

DOCUMENT PROCESSING METHOD AND SYSTEM

BACKGROUND OF THE DISCLOSURE

1. Field of the Disclosure

The disclosure relates to a document processing method for storing a document to a remote server and a document processing system.

2. Description of Related Art

In today's information age, storage and processing of documents are important issues. Along with popularity of communication technology, the user probably wants to access, search or process a same document at different places and different time. By using a remote storage technique, a local client can store a plurality of documents in a remote storage server (RSS) through a communication network. For example, a cloud server could satisfy humungous data storage requirements of multiple clients.

Considering information security, the documents stored in the remote server would have to be encrypted. In order to satisfy a data processing demand (for example, keyword search, etc.) of the client, the remote server in a conventional document processing system should have a decryption capability. For example, the conventional remote server should have a decryption key to convert an encrypted document into a plaintext, and then search the plaintext for the keyword. However, the remote server is probably not reliable. In case that the remote server has the decryption capability, the client could not prevent an unfaithful query processing of the remote server. Namely, the document stored in the remote server could be peeked/leaked.

In another conventional document processing system, the remote server would not have the decryption capability, so that the client should completely download each of the documents of a plurality of the encrypted documents, and then uses a key to decrypt the encrypted documents, so as perform data processing (for example, keyword searching, etc.). Therefore, in case of the humungous data storage requirements, the humungous encrypted documents consume a large amount of bandwidth resources.

SUMMARY OF THE DISCLOSURE

The disclosure is related to a document processing method and a document processing system, which improve information security of remote storage documents, and facilitate a remote server to deal with various data processing requirements.

The disclosure provides a document processing method, which is described as follows. A client divides at least one document into a plurality of document pages, and individually encrypts the document pages by a first key to obtain a plurality of encrypted pages. The client removes a part of words from the document pages to obtain a plurality of significant words, and individually encrypts the significant words by a second key different to the first key to obtain a plurality of encrypted significant words. The client records the encrypted significant words and a plurality of first index information in a significant word set (SWS), where the first index information indicates a page in the encrypted pages where the encrypted significant word comes from. Then, the client transmits the encrypted pages and the SWS to a remote server for storage.

The disclosure provides a document processing system including a remote server and a client. The client is connected to the remote server through a communication network. The client divides at least one document into a plurality of document pages, and individually encrypts the document pages by a first key to obtain a plurality of encrypted pages. Then, the client removes a part of words from the document pages to obtain a plurality of significant words, and individually encrypts the significant words by a second key different to the first key to obtain a plurality of encrypted significant words. The client records the encrypted significant words and a plurality of first index information in a significant word set (SWS), and transmits the encrypted pages and the SWS to the remote server for storage, where the first index information indicates a page in the encrypted pages where the encrypted significant word comes from.

According to the above descriptions, in the disclosure, the client respectively encrypts the document pages and the significant word set by using different keys, and then transmits the encrypted pages and the significant word set to the remote server for storage. Since the remote server does not have the keys, the remote server could not decrypt the document pages and the significant word set. Moreover, since the keys used for encrypting the document pages and the significant word set are different, information security of the document stored in the remote server is enhanced. In addition, as the client extracts the encrypted significant words of the document pages in advance to produce the significant word set, the remote server could perform corresponding processing in an encryption-domain according to various processing requirements (for example, keyword searching, etc.) of the client.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
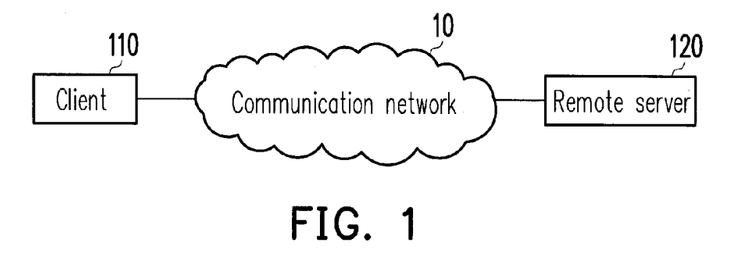
FIG. 1 is a functional block schematic diagram of a document processing system according to an embodiment of the disclosure.

FIG. 1 is a functional block schematic diagram of a document processing system according to an embodiment of the disclosure. The document processing system includes a remote server 120 and a client 110. The remote server 120 can be a remote storage server (RSS), a cloud server or other types of servers. The client 110 can be a personal computer (PC), a notebook computer, a personal digital assistant (PDA), a smart phone or other types of programmable devices. The client 110 is connected to the remote server 120 through a communication network 10.

Figure 2:
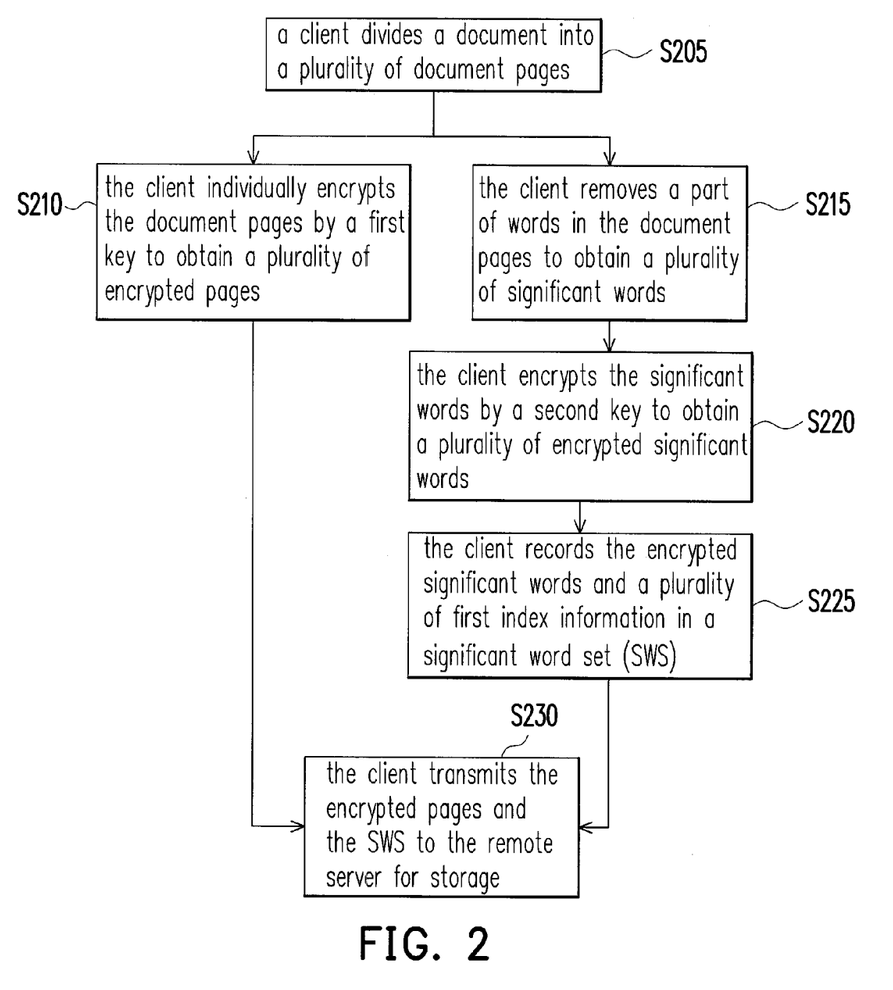
FIG. 2 is a flowchart illustrating a document processing method according to an embodiment of the disclosure.

FIG. 2 is a flowchart illustrating a document processing method according to an embodiment of the disclosure. Referring to FIG. 1 and FIG. 2, before the client 110 transmits one or a plurality of text documents to the remote server 120 through the communication network 10 for storage, the client 110 performs the steps shown in FIG. 2. In step S205, the client 110 divides each of the documents into a plurality of document pages. For example, the client 110 breaks a document into a plurality of pages, and each of the pages has a size of 128 KB. Then, in step S210, the client 110 individually encrypts the document pages by a first key CPS-KEY to obtain a plurality of encrypted pages. The encrypted pages are respectively assigned with a unique identification (ID). In the present embodiment, the client 110 individually compresses the document pages to obtain a plurality of compressed pages, and individually encrypts the compressed pages by the first key CPS-KEY to obtain the encrypted pages. In other embodiments, in the step S210, the client 110 probably does not compress the document pages, instead, the client 110 may directly encrypt the document pages by the first key CPS-KEY to obtain the encrypted pages. The encrypted and compressed pages are one-by-one arranged in a huge file, which is referred to as a compressed page sequence (CPS). Then, the client 110 transmits the encrypted pages (the CPS) to the remote server 120 for storage (step S230).

Moreover, after the step S205, the client 110 further executes a step S215. In the step S215, the client 110 removes a part of words from the document pages that are still not encrypted to obtain a plurality of significant words. Namely, the client 110 identifies a plurality of meaningful words in the document pages. In some embodiments, in the step S215, the client 110 can remove articles (for example, "a", "an" and "the", etc.) and other basic grammar words (for example, "to", "for" and "with", etc.) from the document pages to obtain the significant words. In some other embodiments, in the step S215, after the client 110 removes the articles and the basic grammar words from the document pages to obtain a plurality of original words, the client 110 further performs stemming on the original words to obtain the significant words. The stemming is to convert a single word into a root according to a Porter algorithm or other algorithms, for example, convert the words "retrieve", "retrieval" and "retrieving", etc. into a same root "retriev", and for another example, convert the words "have", "having" and "had", etc. into a same root "hav".

Therefore, according to the step S215, regarding a document with 10000 words, about 500 significant words can be extracted there from. After the step S215 is completed, a step S220 is executed, by which the client 110 individually encrypts the significant words by a second key SWS-KEY to obtain a plurality of encrypted significant words. The first key CPS-KEY and the second key SWS-KEY are two different keys.

After the step S220, a step S225 is executed, by which the client 110 records the encrypted significant words and a plurality of first index information in a significant word set (SWS), where the first index information indicates a page in the encrypted pages where the encrypted significant word comes from. In some embodiments, the first index information may include a file name of the document and a page offset in the document. For example, a document with a file name of AA is divided into 5 pages, and a significant word "home" is extracted from a third page of the document AA (i.e. a third page of encrypted pages), so that the first index information of the significant word "home" includes "AA, 3".

After the step S225 is completed, a step S230 is executed, by which the client 110 transmits the encrypted pages and the SWS to the remote server 120 for storage. The remote server 120 stores the encrypted pages into a database after receiving the encrypted pages. After the remote server 120 receives the SWS, the remote server 120 logs/joins each of the encrypted significant words and the corresponding index information in the SWS to a global search index (GSI) of the remote server 120. For example, the GSI includes a key field and a value field, where the key field records the encrypted significant words, and the value field records the first index information. The GSI is implemented by using some standard open source utilities (for example, Lucene of Apache). Each of the encrypted significant words in the GSI is mapped to the corresponding index information, and the remote server 120 can find the corresponding encrypted page from the database according to the index information.

Figure 3:
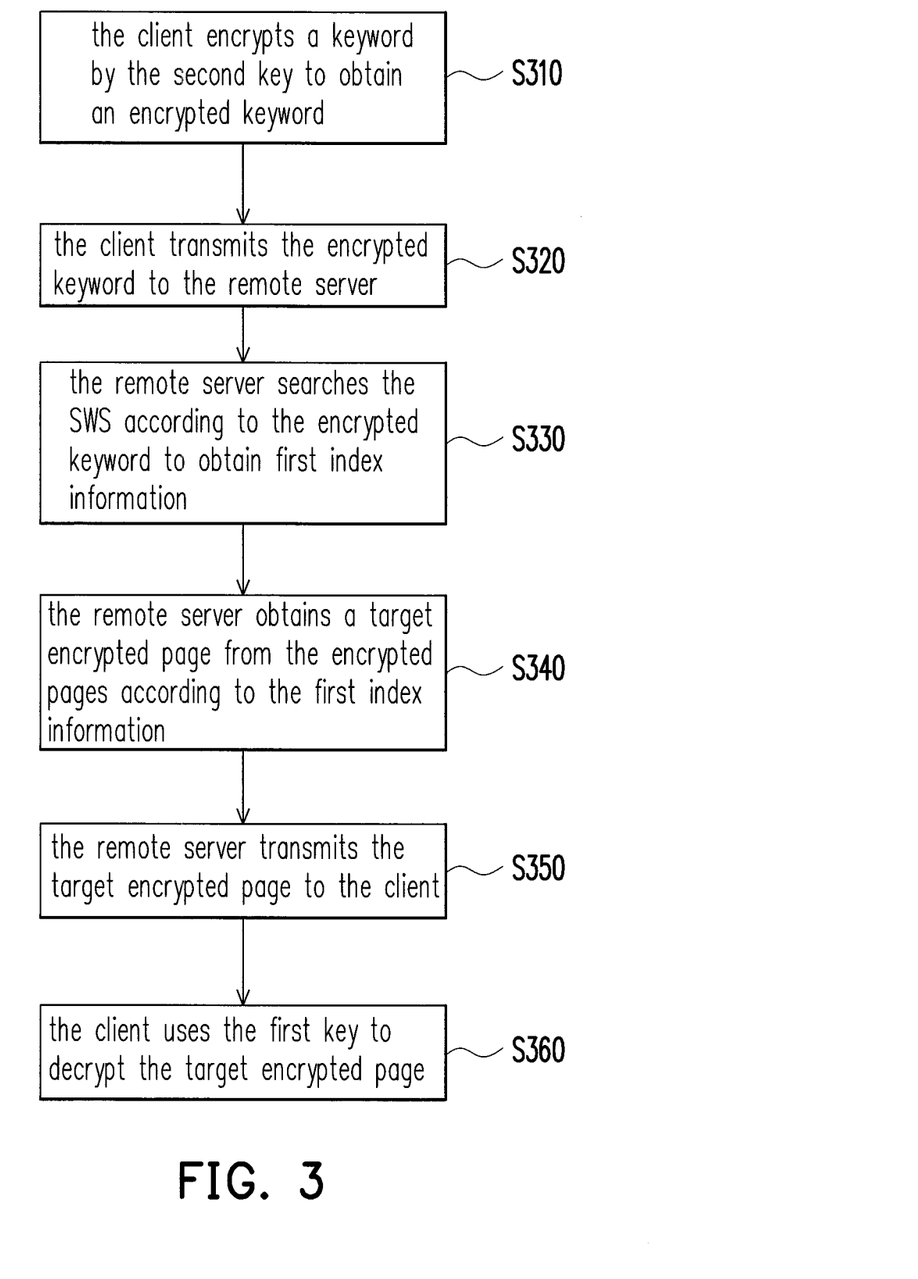
FIG. 3 is a flowchart that a remote server processes a search request of a client according to an embodiment of the disclosure.

FIG. 3 is a flowchart that the remote server 120 processes a search request of the client 110 according to an embodiment of the disclosure. When the client 110 is to search a certain keyword KW, in step S310, the client 110 encrypts the keyword KW by the second key SWS-KEY to obtain an encrypted keyword. Then, the client 110 transmits the encrypted keyword to the remote server 120 (step S320). The remote server 120 searches the SWS according to the encrypted keyword, i.e. searches the GSI to obtain the index information corresponding to the encrypted keyword (step S330). If the remote server 120 can find the encrypted keyword from the SWS, the remote server 120 obtains at least one target encrypted page from the encrypted pages stored in the database according to the index information corresponding to the encrypted keyword (step S340). Then, the remote server 120 transmits the target encrypted page to the client 110 (step S350). It should be noticed that in the step S350, the remote server 120 transmits a part of the encrypted pages of the text document to the client 110 without transmitting all of the encrypted pages of the text document to the client 110.

After the client 110 receives the target encrypted page from the remote server 120, the client 110 uses the first key CPS-KEY to decrypt the target encrypted page (step S360). In some embodiments, if the document pages are first compressed and then encrypted in the step S210 of FIG. 2, in the step S360 of FIG. 3, the client 110 first decrypts the target encrypted page and then performs decompression to convert the target encrypted page into a plaintext document page. After the plaintext document page is obtained, the client 110 performs data processing (for example, a detailed search) of a subsequent stage.

According to the above descriptions, the client 110 uses different keys CPS-KEY and SWS-KEY to respectively encrypt the document pages and the SWS, and then transmits the encrypted document pages and the SWS to the remote server 120 for storage. Since the remote server 120 does not have the keys CPS-KEY and SWS-KEY, the remote server 120 cannot decrypt the encrypted document pages and the SWS. Moreover, since the key CPS-KEY used for encrypting the document pages and the key SWS-KEY used for encrypting the SWS are different, information security of the document stored in the remote server 120 is enhanced.

In addition, as the client 110 extracts the encrypted significant words of the document pages with a large data amount to produce the SWS with a small data amount in advance, the remote server 120 can perform corresponding processing on the SWS with the small data amount in an encryption-domain according to various processing requirements (for example, keyword searching, etc.) of the client 110 without searching the encrypted pages with a huge data amount from the database. Therefore, the operation efficiency of the remote server 120 can be effectively improved. Moreover, the remote server 120 transmits back a part of the encrypted pages of the text document to the client 110 other than transmits back the entire encrypted text document (or all of the encrypted pages) to the client 110, so that a bandwidth resource of the communication network can be effectively saved.

Figure 4:
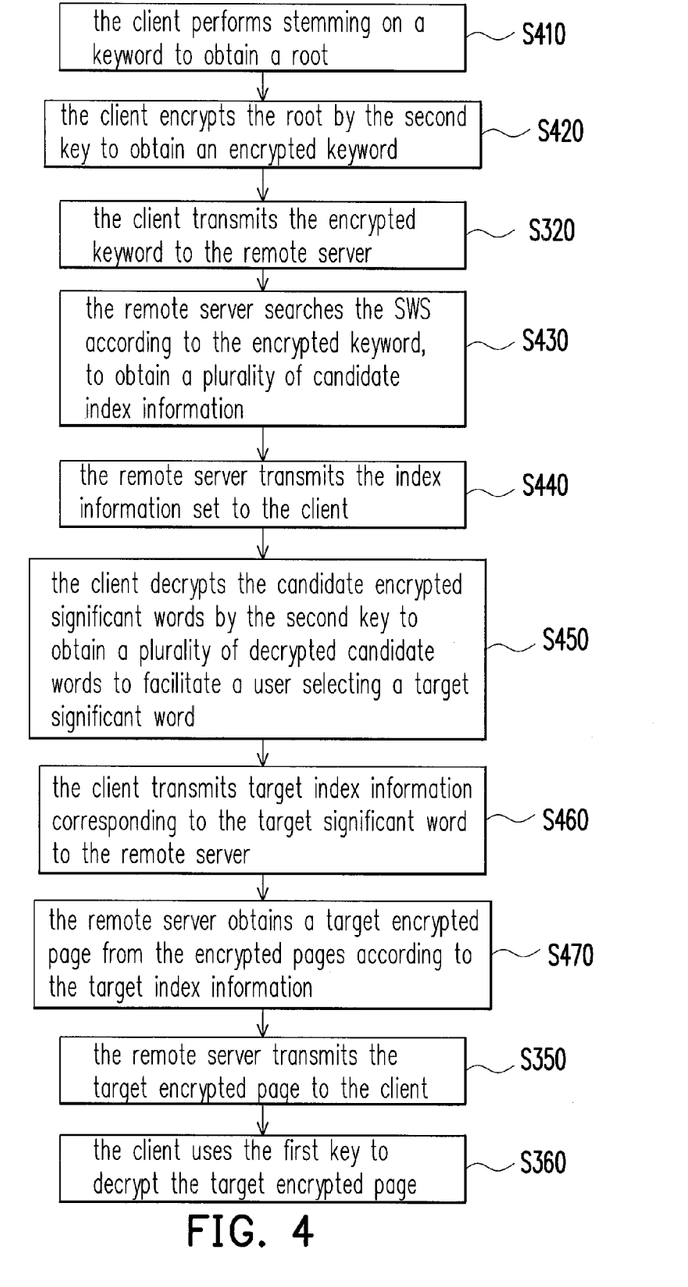
FIG. 4 is a flowchart that a remote server processes a search request of a client according to another embodiment of the disclosure.

FIG. 4 is a flowchart that the remote server 120 processes a search request of the client 110 according to another embodiment of the disclosure. Related descriptions of the embodiment of FIG. 3 can be referred for descriptions of the embodiment of FIG. 4. In some embodiments, when the client 110 is to search a keyword KW, if the stemming is performed in the step S215 of FIG. 2, a step S410 of FIG. 4 is required to be performed, by which the client 110 performs stemming on the keyword KW to obtain a root thereof. After the root of the keyword KW is obtained, the client 110 encrypts the root by the second key SWS-KEY to obtain an encrypted keyword (step S420). Then, the client 110 transmits the encrypted keyword to the remote server 120 (step S320).

After the remote server 120 obtains the encrypted keyword, the remote server 120 searches the SWS according to the encrypted keyword, i.e. searches the GSI to obtain a plurality of candidate index information corresponding to the encrypted keyword (step S430). The candidate index information corresponding to the encrypted keyword forms an index information set, where the index information set includes a plurality of candidate encrypted significant words and a plurality of the candidate index information. The remote server 120 transmits the index information set to the client 110 (step S440).

In some embodiments, the remote server 120 counts occurring times of the encrypted keyword transmitted to the remote server 120 from the client 110 or other clients. Therefore, in step S440, the remote server 120 ranks the index information set according to a most frequently occurring keyword in the SWS of the remote server 120, i.e. according to a searching frequency or times of the keyword in the SWS (the GSI), and transmits the ranked index information set to the client 110.

The client 110 decrypts the candidate encrypted significant words by the second key SWS-KEY to obtain a plurality of decrypted candidate words (step S450), and the user can select a target significant word from the decrypted candidate words. After the user selects the target significant word, the client 110 transmits target index information corresponding to the target significant word in the candidate index information to the remote server 120 (step S460).

According to the target index information transmitted from the client 110, the remote server 120 obtains a corresponding target encrypted page from the encrypted pages stored in the database (step S470), and then transmits the target encrypted page to the client 110 (step S350). The client 110 decrypts the target encrypted page by the first key CPS-KEY (step S360).

Figure 5:
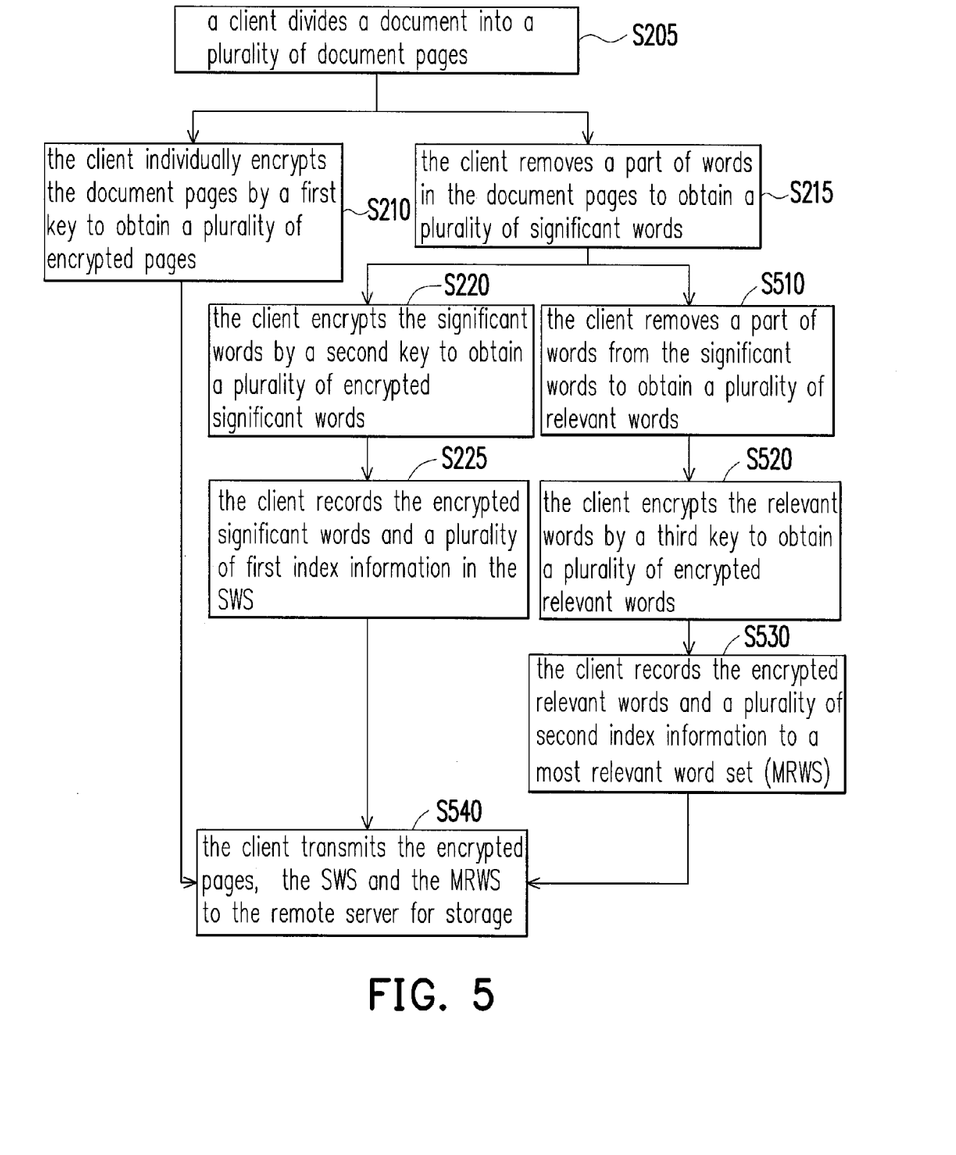
FIG. 5 is a flowchart illustrating a document processing method according to another embodiment of the disclosure.

FIG. 5 is a flowchart illustrating a document processing method according to another embodiment of the disclosure. Descriptions of the embodiment of FIG. 5 can referred to related descriptions of the embodiment of FIG. 2, and different to the embodiment of FIG. 2, the embodiment of FIG. 5 further includes steps S510-S540. Referring to FIG. 1 and FIG. 5, after the step S215, the client 110 executes the step S510. In the step S510, the client 110 removes a part of words from the significant words of the step S215 to obtain a plurality of relevant words. For example, in the step S510, a commonly used word set is defined, and words belonged to the commonly used word set are removed from the significant words to obtain the relevant words. In some embodiments, the client 110 selects representative samples from the significant words of the step S215, and these words are likely to appear in most of the queries.

In the present embodiment, the client 110 defines most repeated words of the English vocabulary as the commonly used word set, and removes the most repeated words of the English vocabulary from the significant words of the step S215 to obtain the relevant words (step S510). For example, the English vocabulary is ranked according to commonly used degrees of the words, and the front 1% of the most repeated words are extracted to serve as the commonly used word set. Then, the client 110 removes the words belonged to the commonly used word set from the significant words to obtain the relevant words. According to the number of words in the commonly used word set, the client 110 can control the number of the relevant words in the step S510. For example, regarding a document with 10000 words, about 500 significant words can be extracted there from according to the step S215, and 50 relevant words can be extracted from the 500 significant words according to the step S510.

Then, the client 110 individually encrypts the relevant words by a third key MRWS-KEY to obtain a plurality of encrypted relevant words (step S520), where the third key MRWS-KEY is different to the first key CPS-KEY and the second key SWS-KEY. The user can use standard open source key generation utilities to generate the first key CPS-KEY, the second key SWS-KEY and the third key MRWS-KEY. According to the key generation utilities, the client 110 can generate the three keys CPS-KEY, SWS-KEY and MRWS-KEY by using one passphrase.

In the step S530, the client 110 records the encrypted relevant words and a plurality of second index information to a most relevant word set (MRWS). The second index information indicates a page in the encrypted pages where the encrypted relevant word comes from. For example, a document with a file name of AA is divided into 5 pages, and a relevant word "tablet" is extracted from a fourth page of the document AA (i.e. a fourth page of encrypted pages), so that the second index information of the relevant word "tablet" includes "AA, 4".

After the MRWS is established, in the step S540, the client 110 transmits the encrypted pages of the step S210, the SWS of the step S225 and the MRWS of the step 530 to the remote server 120 for storage. During a process of transmitting the SWS and the MRWS to the remote server 120, the client 110 is unnecessary to notify the remote server 120 which one is the SWS and which one is the MRWS. The server 120 should not be aware of which index is the SWS and the MRWS. The SWS and the MRWS should look alike for the server 120. So even on reply, no distinction is made between the SWS and the MRWS. Only the client 110 knows this information, because the client 110 has the third key MRWS-KEY.

In other embodiment, the client 110 further prevents any knowledge gaining from the server 120. For example, the client 110 sends dummy MRWS periodically to make sure the server 120 doesn't try to match the SWS and the MRWS pairing. For the very same reason, even during query search: the client 110 will first encrypt the keyword with SWS-KEY and sends it for search. Then after sending several random number of such requests, it then encrypts using the third key MRWS-KEY and sends that keyword for querying. So the client 110 cannot do search result subset confirmation immediately.

After the remote server 120 receives the encrypted pages, the remote server 120 stores the encrypted pages to the database. After the remote server 120 receives the SWS and the MRWS, the remote server 120 logs/joins each of the encrypted significant words and the corresponding index information in the SWS to the GSI of the remote server 120, and logs/joins each of the encrypted relevant words and the corresponding index information in the MRWS to the GSI of the remote server 120. Each of the encrypted words in the GSI is mapped to a corresponding document ID, where the document ID indicates an encrypted page where a given word can be found. The document ID is combination of a file name and a page offset in the document, and the file name and the page offset are combined and encrypted. The GSI is implemented by using some standard open source utilities (for example, Lucene of Apache).

By mixing storing the SWS and the MRWS in the GSI, most of statistical attacks can be prevented since an attacker cannot obtain information about a word usage frequency. In other embodiments, the client 110 can further insert null keywords at random points in the MRWS to assist preventing any statistical attack.

Figure 6:
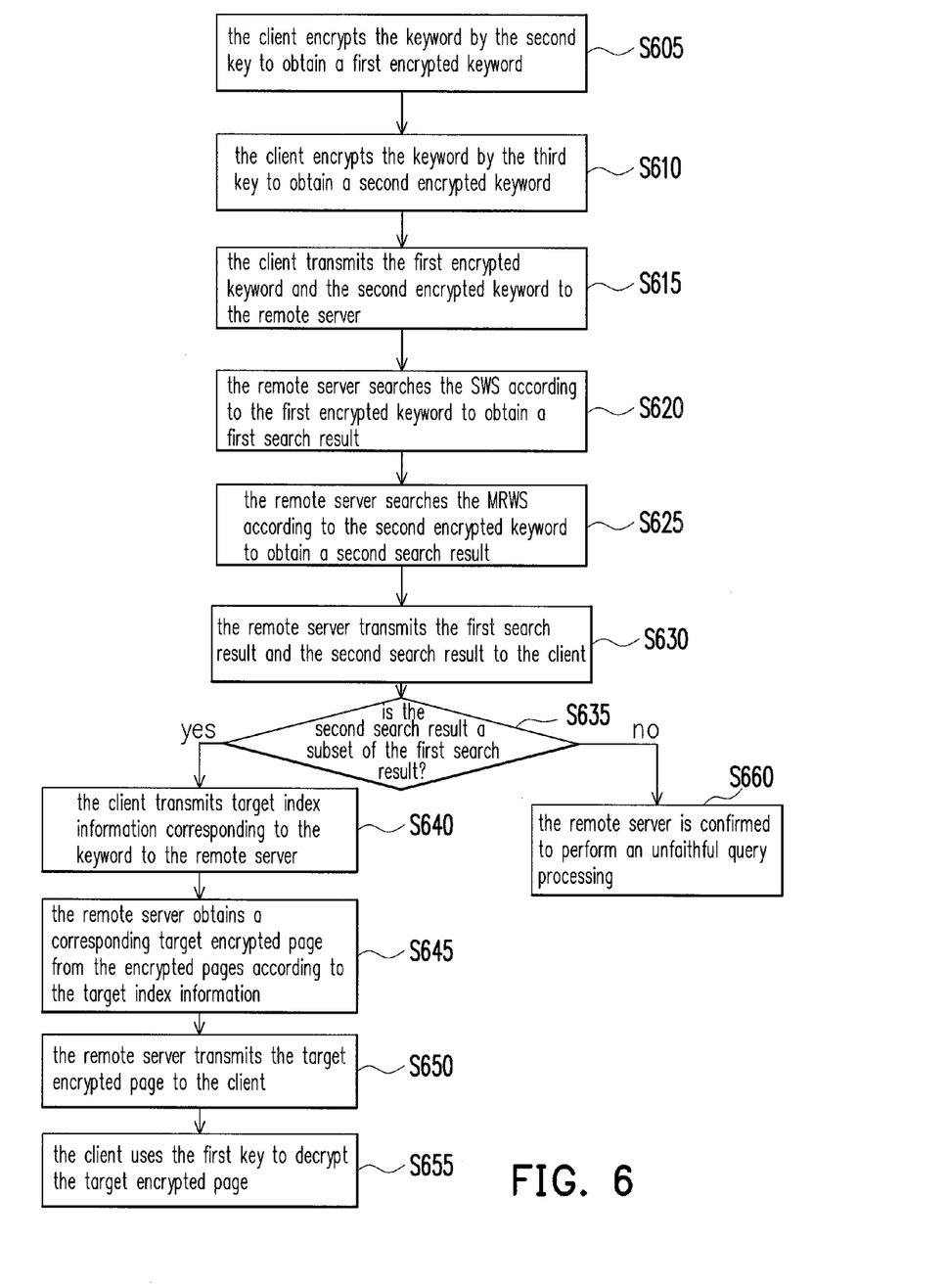
FIG. 6 is a flowchart that a remote server processes a search request of a client according to still another embodiment of the disclosure.

FIG. 6 is a flowchart that the remote server 120 processes a search request of the client 110 according to still another embodiment of the disclosure. When the client 110 is to search a certain keyword KW, in step S605, the client 110 encrypts the keyword KW by the second key SWS-KEY to obtain a first encrypted keyword, and in step S610, the client 110 encrypts the same keyword KW by the third key MRWS-KEY to obtain a second encrypted keyword. After the encryptions are completed, in step S615, the client 110 transmits the first encrypted keyword and the second encrypted keyword to the remote server 120. Since different keys SWS-KEY and MRWS-KEY are used to encrypt the same keyword KW, the remote server 120 cannot distinguish the two indexes of the SWS and the MRWS.

The remote server 120 searches the SWS according to the first encrypted keyword to obtain a first search result corresponding to the first encrypted keyword (step S620). Moreover, the remote server 120 searches the MRWS according to the second encrypted keyword to obtain a second search result corresponding to the second encrypted keyword (step S625). In the embodiment that the SWS and the MRWS are mixingly stored in the GSI, the remote server 120 searches the GSI according to the first encrypted keyword to obtain the first search result, and searches the GSI according to the second encrypted keyword to obtain the second search result. Thereafter, the remote server 120 executes a step S630 to transmit the first search result and the second search result to the client 110.

Generally, the client 110 can send the search request to the remote server 120 by using a plurality of keywords, and the client 110 probably wants to know files most relevant to the keywords. The remote server 120 uses arbitrary combinations of the keywords to optimize a plurality of document IDs in the first search result. The remote server 120 further performs optimization by using a keyword based ranking system. For example, the remote server 120 can arrange the first search result according to an ascending order of the document IDs. For another embodiment, the remote server 120 can arrange the order of the document IDs in the first search result according to the number of the keywords contained in a single document. For still another embodiment, the remote server 120 can also arrange the order of the document IDs in the first search result according to referred times of the keywords. For example, the GSI has 1000 encrypted words (encrypted keywords and/or encrypted relevant words) pointed to a first document, and has 500 encrypted words (encrypted keywords and/or encrypted relevant words) pointed to a second document, the first document then is arranged before the second document in the first search result.

The remote server 120 merges a plurality of query results and transmits back a united result, and such result has been ranked according to the most frequently occurring keyword in the encrypted index of the remote server 120. Such method avails the client 110 performing quick and efficient analysis. Since the keyword KW is fundamentally encrypted, particularly, after performing the stemming and deleting the basic grammar words, the encrypted index (i.e. the SWS) only has specific given words, statistical attacks can be prevented.

In other embodiment, for preventing any knowledge gaining from the server 120, even during query search, the client 110 will encrypt the keyword with the second key SWS-KEY to obtain the first encrypted keyword, and sends the first encrypted keyword to the server 120 for search. The server 120 searches the SWS and the MRWS according to the first encrypted keyword to obtain a first search result corresponding to the first encrypted keyword. The server 120 transmits the first search result to the client 110. Then the client 110 will encrypt the same keyword with the third key MRWS-KEY to obtain the second encrypted keyword, and sends the second encrypted keyword to the server 120 for search. The server 120 searches the SWS and the MRWS according to the second encrypted keyword to obtain a second search result corresponding to the second encrypted keyword. The server 120 transmits the second search result to the client 110.

Then, the client 110 uses the second key SWS-KEY and the third key MRWS-KEY to decrypt the first search result and the second search result, and then compares the decrypted first search result and the second search result (step S635). Since the MRWS is a subset of the SWS, generally, the second search result is a subset of the first search result. If it is determined that the second search result is the subset of the first search result according to the step S635, a step S640 is executed, by which the client 110 transmits target index information corresponding to the keyword KW in the first search result to the remote server 120.

According to the target index information transmitted from the client 110, the remote server 120 obtains a corresponding target encrypted page from the encrypted pages stored in the database (step S645), and then transmits the target encrypted page to the client 110 (step S650). It should be noticed that the remote server 120 transmits back a part of the encrypted pages of the text document to the client 110 other than transmits back the entire encrypted text document (or all of the encrypted pages) to the client 110, so that a bandwidth resource of the communication network can be effectively saved.

When a search query requires document pages corresponding to the keyword KW, the document processing system intelligently transmits a minimum number of the required pages of the document from the remote server 120 to the local client 110. According to the received encrypted pages, the client 110 uses the first key CPS-KEY to decrypt the target encrypted page, so as to convert the target encrypted page into the plaintext document (step S655). After the client 110 decrypts and decompresses the document pages, the client 110 further performs detailed searching or data processing of a subsequent stage. In this way, the network bandwidth is optimally used.

If it is determined that the second search result is not the subset of the first search result according to the step S635, the remote server 120 is confirmed to perform an unfaithful query processing (step S660). In some embodiments, in the step S660, a suitable action is undertaken, for example, a sound/light alarm is sent, or such event is recorded in a system log file. The two search indexes of the SWS and the MRWS are used to confirm the unfaithful query processed by the data storage server (i.e. the remote server 120). When the same keyword is used to simultaneously search the SWS and the MRWS, if the keyword can be found in the MRWS and cannot be found in the SWS, the remote server 120 is confirmed to perform the unfaithful query processing.

However, both the SWS and the MRWS may return 0 results. The NULL set returned from MRWS is a subset of NULL set returned from SWS, and therefore even though the server 120 could have possibly unfaithfully executed, the client 110 have no way of finding it. In order to catch this corner case, the client 110 proceeds with the following action. The client 110 creates a test text with known keywords and then remembers in some persistent storage (e.g. hard disk). The test text and other documents are processed by the steps S205, S210, S215, S220, S225, S510, S520 and S530 of FIG. 5 to obtain the contents of the SWS and the MRWS. And then sends the SWS and the MRWS to the server 120 (i.e. step S530 of FIG. 5). Later some time, the client 110 will query using some of the keywords including the known keyword of the test text. Obviously, the search result for the SWS and the MRWS should contain the keywords that the client 110 has stored persistently. If there's a NULL reply from server, then the client 110 can easily judge the server 120 has performed an unfaithful execution.

Since three different keys CPS-KEY, SWS-KEY and MRWS-KEY are used to encrypt the same keyword, the document processing system is more robust. Even if the remote server 120 learns a scheme of the whole document processing system, the remote server 120 still cannot analyse the encrypt pages in the database and the SWS and the MRWS in the GSI. The encrypted page, the SWS and the MRWS appear to be completely different since they are respectively encrypted by using different keys. Therefore, unless the remote server 120 has the three keys CPS-KEY, SWS-KEY and MRWS-KEY, the remote server 120 cannot perform any analysis on the data stored therein.

In summary, in the disclosure, the client 110 uses different keys CPS-KEY, SWS-KEY and MRWS-KEY to respectively encrypt the document pages, the SWS and the MRWS, and transmits the encrypted document pages, the SWS and the MRWS to the remote server 120 for storage. Since the remote server 120 does not have the keys, the remote server 120 cannot decrypt the encrypted pages, the SWS and the MRWS. Moreover, since the keys used for encrypting the document pages, the SWS and the MRWS are different, information security of the document stored in the remote server 120 is enhanced. In addition, as the client 110 extracts a part of the words of the document pages in advance to produce the SWS and the MRWS, the remote server 120 can perform corresponding processing in an encryption-domain according to various processing requirements (for example, keyword searching, etc.) of the client 110.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A document processing method, comprising:
   dividing at least one document into a plurality of document pages through a client;
   individually encrypting the document pages by a first key to obtain a plurality of encrypted pages through the client;
   removing a part of words from the document pages to obtain a plurality of significant words through the client;
   removing a part of words from the significant words through the client to obtain a plurality of relevant words;
   individually encrypting the significant words by a second key different to the first key to obtain a plurality of encrypted significant words through the client;
   individually encrypting the relevant words by a third key different to the first key and the second key to obtain a plurality of encrypted relevant words through the client;
   recording the encrypted significant words and a plurality of first index information in a significant word set through the client, wherein the first index information indicates a page in the encrypted pages where the encrypted significant word comes from;
   recording the encrypted relevant words and a plurality of second index information in a most relevant word set through the client, wherein the second index information indicates a page in the encrypted pages where the encrypted relevant word comes from;
   transmitting the encrypted pages the significant word set, and the most relevant word set from the client to a remote server for storage;
   encrypting a keyword by the second key through the client to obtain a first encrypted keyword;
   encrypting the keyword by the third key through the client to obtain a second encrypted keyword;
   transmitting the first encrypted keyword and the second encrypted keyword from the client to the remote server;
   searching the significant word set according to the first encrypted keyword through the remote server, so as to obtain a first search result corresponding to the first encrypted keyword;
   searching the most relevant word set according to the second encrypted keyword through the remote server, so as to obtain a second search result corresponding to the second encrypted keyword;
   transmitting the first search result and the second search result from the remote server to the client; and
   comparing the first search result and the second search result through the client, wherein when the second search result is not a subset of the first search result, the remote server is confirmed to perform an unfaithful query processing.

2. The document processing method as claimed in claim 1, wherein the step of encrypting the document pages comprises:
   individually compressing the document pages to obtain a plurality of compressed pages; and
   encrypting the compressed pages by the first key to obtain the encrypted pages.

3. The document processing method as claimed in claim 1, wherein the first index information comprises a file name of the document and a page offset in the document.

4. The document processing method as claimed in claim 1, wherein the step of removing the part of words in the document pages comprises:
   removing articles and basic grammar words from the document pages to obtain the significant words through the client.

5. The document processing method as claimed in claim 4, further comprising:
   encrypting a keyword by the second key to obtain an encrypted keyword through the client when the client is to search the keyword;
   transmitting the encrypted keyword from the client to the remote server;
   searching the significant word set according to the encrypted keyword through the remote server, so as to obtain first index information corresponding to the encrypted keyword;
   obtaining a target encrypted page from the encrypted pages according to the first index information corresponding to the encrypted keyword through the remote server;
   transmitting the target encrypted page from the remote server to the client; and
   decrypting the target encrypted page by the first key through the client.

6. The document processing method as claimed in claim 1, wherein the step of removing the part of words in the document pages comprises:
   removing articles and basic grammar words from the document pages to obtain a plurality of original words through the client; and
   stemming the original words to obtain the significant words through the client.

7. The document processing method as claimed in claim 6, further comprising:
   stemming a keyword to obtain a root through the client when the client is to search the keyword;
   encrypting the root by the second key through the client to obtain an encrypted keyword;
   transmitting the encrypted keyword from the client to the remote server;
   searching the significant word set according to the encrypted keyword through the remote server, so as to obtain an index information set corresponding to the encrypted keyword, wherein the index information set comprises a plurality of candidate encrypted significant words and a plurality of candidate index information;
   transmitting the index information set from the remote server to the client;
   decrypting the candidate encrypted significant words by the second key through the client to obtain a plurality of decrypted candidate words, so as to facilitate a user selecting a target significant word from the decrypted candidate words;
   transmitting target index information corresponding to the target significant word in the candidate index information from the client to the remote server;
   obtaining a target encrypted page from the encrypted pages according to the target index information through the remote server;
   transmitting the target encrypted page from the remote server to the client; and
   decrypting the target encrypted page by the first key through the client.

8. The document processing method as claimed in claim 7, wherein the step of transmitting the index information set from the remote server to the client comprises:
   ranking the index information set according to a most frequently occurring keyword in the significant word set of the remote server; and
   transmitting the ranked index information set to the client.

9. The document processing method as claimed in claim 1, wherein the step of removing the part of words from the significant words comprises:
   defining a commonly used word set; and
   removing words belonged to the commonly used word set from the significant words to obtain the relevant words.

10. The document processing method as claimed in claim 1, further comprising:
    storing the encrypted pages to a database through the remote server; and
    logging the encrypted significant words and the first index information of the significant word set in a global search index of the remote server.

11. The document processing method as claimed in claim 10, wherein the global search index comprises a key field and a value field, the key field records the encrypted significant words, and the value field records the first index information.

12. A document processing system, comprising:
    a remote server; and
    a client, connected to the remote server through a communication network, wherein the client divides at least one document into a plurality of document pages, individually encrypts the document pages by a first key to obtain a plurality of encrypted pages, removes a part of words from the document pages to obtain a plurality of significant words, removes a part of words from the significant words to obtain a plurality of relevant words, individually encrypts the significant words by a second key different to the first key to obtain a plurality of encrypted significant words, individually encrypts the relevant words by a third key different to the first key and the second key to obtain a plurality of encrypted relevant words, records the encrypted significant words and a plurality of first index information in a significant word set, records the encrypted relevant words and a plurality of second index information in a most relevant word set, and transmits the encrypted pages, the significant word set, and the most relevant word set to the remote server for storage, wherein the first index information indicates a page in the encrypted pages where the encrypted significant word comes from, and the second index information indicates a page in the encrypted pages where the encrypted relevant word comes from,
    wherein the client encrypts a query keyword by the second key to obtain a first encrypted keyword, encrypts the query keyword by the third key to obtain a second encrypted keyword, and transmits the first encrypted keyword and the second encrypted keyword to the remote server,
    wherein the remote server searches the significant word set according to the first encrypted keyword to obtain a first search result corresponding to the first encrypted keyword, searches the most relevant word set according to the second encrypted keyword to obtain a second search result corresponding to the second encrypted keyword and transmits the first search result and the second search result to the client,
    wherein the client compares the first search result and the second search result,
    and wherein when the second search result is not a subset of the first search result, the remote server is confirmed to perform an unfaithful query processing.

13. The document processing system as claimed in claim 12, wherein the client individually compresses the document pages to obtain a plurality of compressed pages, and the client encrypts the compressed pages by the first key to obtain the encrypted pages.

14. The document processing system as claimed in claim 12, wherein the first index information comprises a file name of the document and a page offset in the document.

15. The document processing system as claimed in claim 12, wherein the client removes articles and basic grammar words from the document pages to obtain the significant words.

16. The document processing system as claimed in claim 15, wherein when the client is to search a keyword, the client encrypts the keyword by the second key to obtain an encrypted keyword, and transmits the encrypted keyword from the client to the remote server; the remote server searches the significant word set according to the encrypted keyword to obtain first index information corresponding to the encrypted keyword, obtains a target encrypted page from the encrypted pages according to the first index information, and transmits the target encrypted page from the remote server to the client; and the client decrypts the target encrypted page by the first key.

17. The document processing system as claimed in claim 12, wherein the client removes articles and basic grammar words from the document pages to obtain a plurality of original words, and the client performs stemming on the original words to obtain the significant words.

18. The document processing system as claimed in claim 17, wherein when the client is to search a keyword, the client performs stemming on the keyword to obtain a root; the client encrypts the root by the second key to obtain an encrypted keyword; the client transmits the encrypted keyword to the remote server; the remote server searches the significant word set according to the encrypted keyword to obtain an index information set corresponding to the encrypted keyword, wherein the index information set comprises a plurality of candidate encrypted significant words and a plurality of candidate index information; the remote server transmits the index info nation set to the client; the client decrypts the candidate encrypted significant words by the second key to obtain a plurality of decrypted candidate words, so as to facilitate a user selecting a target significant word from the decrypted candidate words; the client transmits target index information corresponding to the target significant word in the candidate index information to the remote server; the remote server obtains a target encrypted page from the encrypted pages according to the target index information; the remote server transmits the target encrypted page to the client; and the client decrypts the target encrypted page by the first key.

19. The document processing system as claimed in claim 18, wherein the remote server ranks the index information set according to a most frequently occurring keyword in the significant word set.

20. The document processing system as claimed in claim 12, wherein the client defines a commonly used word set; and the client removes words belonged to the commonly used word set from the significant words to obtain the relevant words.

21. The document processing system as claimed in claim 12, wherein the document includes a test text with at least a known keyword, and the query keyword includes the known keyword.

22. The document processing system as claimed in claim 12, wherein the remote server stores the encrypted pages to a database; and the remote server logs the encrypted significant words and the first index information of the significant word set in a global search index of the remote server.

23. The document processing system as claimed in claim 22, wherein the global search index comprises a key field and a value field, the key field records the encrypted significant words, and the value field records the first index information.

* * * * *